United States Patent
Morihira

[11] Patent Number: 6,146,269
[45] Date of Patent: Nov. 14, 2000

[54] APPARATUS FOR AND METHOD OF DETERMINING WIN FOR COMPETITIVE VIDEO GAME, AND RECORDING MEDIUM STORING WIN DETERMINING PROGRAM

[75] Inventor: Shigeki Morihira, Amagasaki, Japan

[73] Assignee: Konami Corporation, Hyogo-ken, Japan

[21] Appl. No.: 08/910,504

[22] Filed: Aug. 4, 1997

[30] Foreign Application Priority Data

Aug. 6, 1996 [JP] Japan .................................. 8-207431

[51] Int. Cl.[7] ...................................................... A63F 13/00
[52] U.S. Cl. .............................................. 463/8; 463/23
[58] Field of Search ..................... 463/1–8, 23, 36–38, 463/43–47, 47.1, 48, 49, 51, 31

[56] References Cited

U.S. PATENT DOCUMENTS

| | | | |
|---|---|---|---|
| 4,089,524 | 5/1978 | Hauck . | |
| 4,090,712 | 5/1978 | Shields, Jr. ................................. | 463/8 |
| 4,491,324 | 1/1985 | Yoshida ....................................... | 463/8 |
| 4,569,526 | 2/1986 | Hamilton .................................. | 273/237 |
| 4,738,451 | 4/1988 | Logg .......................................... | 463/15 |
| 4,905,147 | 2/1990 | Logg .......................................... | 463/2 |
| 5,083,271 | 1/1992 | Thacher et al. . | |
| 5,362,049 | 11/1994 | Hofer ......................................... | 273/118 |
| 5,462,275 | 10/1995 | Lowe et al. . | |
| 5,580,308 | 12/1996 | Nakamura .................................. | 463/7 |
| 5,720,663 | 2/1998 | Nakatani et al. .......................... | 463/23 |
| 5,769,719 | 6/1998 | Hsu .......................................... | 463/37 |
| 5,800,265 | 9/1998 | Yamazaki et al. ........................ | 463/23 |

FOREIGN PATENT DOCUMENTS 0744199  11/1996  European Pat. Off. .

OTHER PUBLICATIONS

Corey Sandler and Tom Badgett, The Official TurboGrafx–16 Game Encyclopedia, relevant pages are the cover, i–iii, and 236–254, Nov. 1990.

*Primary Examiner*—Valencia Martin-Wallace
*Assistant Examiner*—John M. Hotaling, II
*Attorney, Agent, or Firm*—Jordan and Hamburg LLP

[57] ABSTRACT

Images of game characters of a competitive video game are displayed on a display unit under the control of a control unit based on image data stored in a memory. The displayed game characters are moved by keys on first and second manual controllers that are operated by game players of the competitive video game. Additive and subtractive elements representing at least the techniques, effectiveness and ineffectiveness decisions about the techniques, and movements of the game characters, and points assigned to the additive and subtractive elements are registered in a register unit. While a match is in progress, points of additive and subtractive elements gained by the game characters are accumulated by first and second calculators. When a predetermined period of time measured by a timer for the match elapses, the accumulated points are compared by a comparator, and one of the game characters with more accumulated points is determined as the winner of the match.

12 Claims, 5 Drawing Sheets

APPARATUS FOR AND METHOD OF DETERMINING WIN FOR COMPETITIVE VIDEO GAME, AND RECORDING MEDIUM STORING WIN DETERMINING PROGRAM

BACKGROUND OF THE INVENTION

1. Field of the Invention:

The present invention relates to an apparatus for and a method of determining a win for a competitive video game upon elapse of a predetermined period of time after two game characters have started competing for a match such as a martial-arts combat, and a recording medium which stores a win determining program for determining a win for such a competitive video game.

2. Prior Art:

There have been known competitive video games that are played by two game players to control their own game characters to engage in a combat such as a martial-arts combat in an attempt to win the game within a predetermined period of time. If either of the game characters fails to win the game within the predetermined period of time, then it has been customary to compare remaining virtual physical strengths of the game characters, which are an element to relied upon to decide which one of the game characters is superior to the other at the end of the predetermined period of time, and determine the game character with the greater remaining virtual physical strength as the winner of the game.

However, the above customary win determining process suffers certain problems. When the predetermined period of time is drawing to a close, the game player who controls the game character having an edge over the opponent with respect to the remaining virtual physical strength tends to keep taking defensive actions such as "waiting" and "evasive" actions, which look unfair to the opponent, and the game player who controls the game character having the smaller remaining virtual physical strength is liable to lose fighting spirits. In such a situation, the game players quickly lose interest in the game.

Another disadvantage is that a superior one of the game contestants is apt to use easy practical techniques only, which seldom fail, in efforts to secure a win at the end of the predetermined period of time. Such a tactic makes the game monotonous and less interesting to the game players.

SUMMARY OF THE INVENTION

It is therefore an object of the present invention to provide an apparatus for and a method of determining a win for a competitive video game while preventing the game from becoming less interesting when a period of time established for a match runs out while the game characters are engaging in the match.

Another object of the present invention is to provide a recording medium which stores a program for determining a win for a competitive video game.

According to an aspect of the present invention, there is provided an apparatus for determining a win for a competitive video game, comprising display means for displaying two game characters, a pair of manual controllers for controlling the game characters to apply a plurality of techniques and to move with respect to each other, timer means for measuring a predetermined period of time for a match, register means for registering additive and subtractive elements representing at least the techniques, effectiveness and ineffectiveness decisions about the techniques, and movements of the game characters, and points assigned to the additive and subtractive elements, decision means for determining whether an action indicated by one of the manual controllers to control the game characters corresponds to one of the additive and subtractive elements or not, calculating means for, if an action indicated by one of the manual controllers to control the game characters is determined as corresponding to one of the additive and subtractive elements, for accumulating the point assigned to the one of the additive and subtractive elements for the corresponding game character, and win decision means for determining one of the game characters which has gained more accumulated points than the other game character as the winner of the match when the predetermined period of time measured by the timer means elapses, the display means including means for displaying the accumulated points gained by the game characters and the winner of the match.

When the predetermined period of time measured by the timer means elapses, the win decision means determines one of the game characters which has gained more accumulated points than the other game character as the winner of the match. Therefore, game players of the competitive video game are unaware of the result of the game until the winner is determined on the basis of the accumulated points of the game characters, and hence are prevented from losing interest in the game before the match is over.

The register means may register bonus points to be given to one of the game characters by the calculating means according to a predetermined rule when accumulated points for the game characters are the same as each other. A bonus point given to one of the game characters assures that the winner of the game will necessarily be determined at the end of the predetermined time.

The apparatus may further comprise win count calculating means for assigning a win count to the winner of the match and accumulating win counts for the game characters, winner determining means for determining one of the game characters as a final winner when the win counts of the one of the game characters reach a predetermined value, and control means for carrying out a succession of matches for the game characters to play until the win counts of the one of the game characters reach the predetermined value. Since successive matches are carried out until a final winner is determined, game players of the competitive video game find the game interesting.

According to another aspect of the present invention, there is provided a method of determining a win for a competitive video game, comprising the steps of displaying two game characters, controlling the game characters to apply a plurality of techniques and to move with respect to each other, measuring a predetermined period of time for a match, registering additive and subtractive elements representing at least the techniques, effectiveness and ineffectiveness decisions about the techniques, and movements of the game characters, and points assigned to the additive and subtractive elements, determining whether an action indicated by one of the manual controllers to control the game characters corresponds to one of the additive and subtractive elements or not, if an action to control the game characters is determined as corresponding to one of the additive and subtractive elements, accumulating the point assigned to the one of the additive and subtractive elements for the corresponding game character, determining one of the game characters which has gained more accumulated points than the other game character as the winner of the match when the predetermined period of time elapses, and displaying the accumulated points gained by the game characters and the winner of the match.

The method may further comprise the step of registering a bonus point to be given to one of the game characters according to a predetermined rule when accumulated points for the game characters are the same as each other. The method may further comprise the steps of assigning a win count to the winner of the match and accumulating win counts for the game characters, determining one of the game characters as a final winner when the win counts of the one of the game characters reach a predetermined value, and carrying out a succession of matches for the game characters to play until the win counts of the one of the game characters reach the predetermined value.

According to still another aspect of the present invention, there is provided a recording medium which stores a win determining program for a competitive video game, the win determining program comprising the steps of displaying two game characters, controlling the game characters to apply a plurality of techniques and to move with respect to each other, measuring a predetermined period of time for a match, registering additive and subtractive elements representing at least the techniques, effectiveness and ineffectiveness decisions about the techniques, and movements of the game characters, and points assigned to the additive and subtractive elements, determining whether an action indicated by one of the manual controllers to control the game characters corresponds to one of the additive and subtractive elements or not, if an action to control the game characters is determined as corresponding to one of the additive and subtractive elements, accumulating the point assigned to the one of the additive and subtractive elements for the corresponding game character, determining one of the game characters which has gained more accumulated points than the other game character as the winner of the match when the predetermined period of time elapses, and displaying the accumulated points gained by the game characters and the winner of the match.

The win determining program may further comprise the step of registering a bonus point to be given to one of the game characters according to a predetermined rule when accumulated points for the game characters are the same as each other. The win determining program may further comprise the steps of assigning a win count to the winner of the match and accumulating win counts for the game characters, determining one of the game characters as a final winner when the win counts of the one of the game characters reach a predetermined value, and carrying out a succession of matches for the game characters to play until the win counts of the one of the game characters reach the predetermined value.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Figure 1:
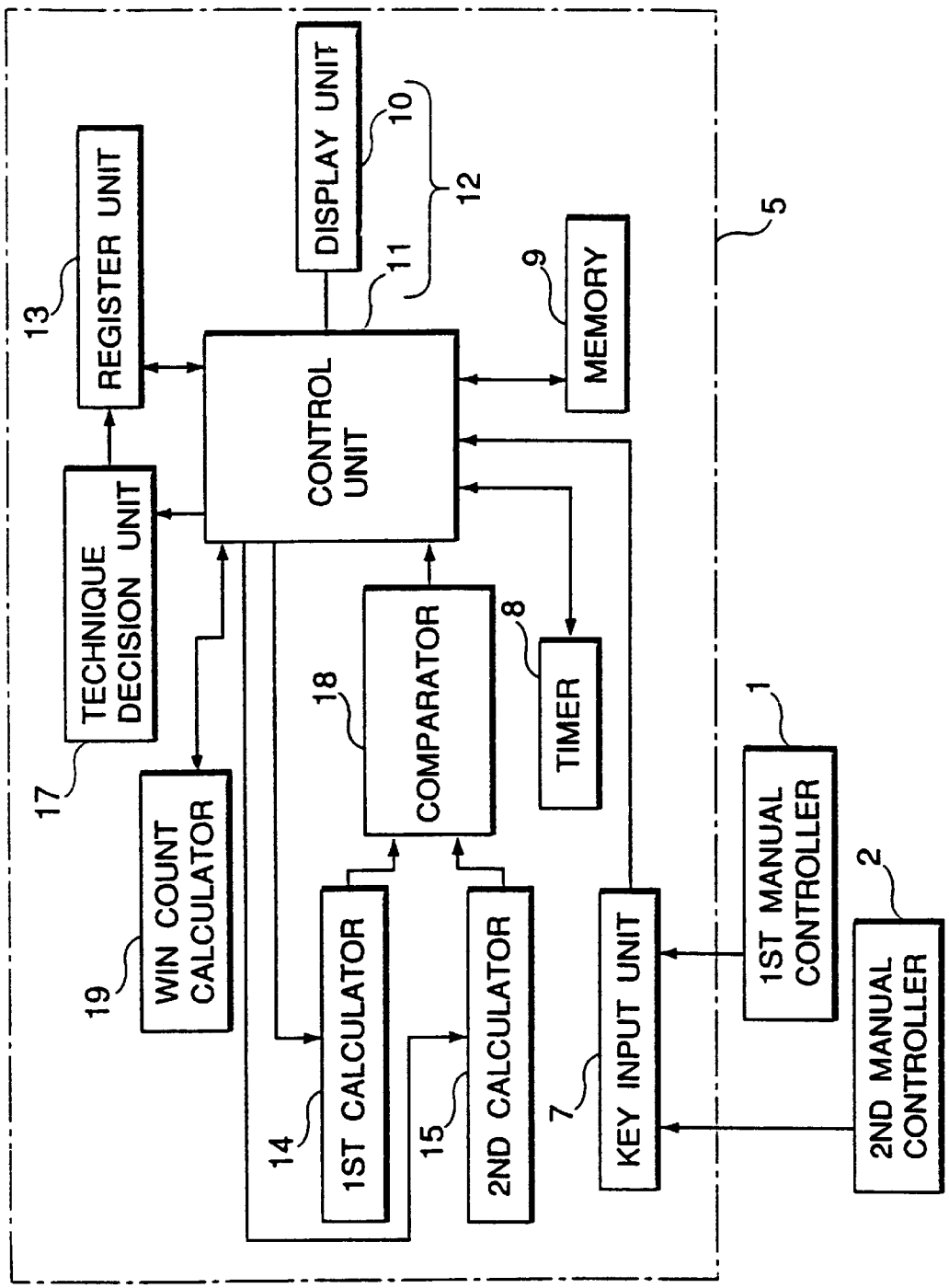
FIG. 1 is a block diagram of an apparatus for determining a win for a competitive video game according to the present invention.

As shown in FIG. 1, a game machine 5 which incorporates the principles of the present invention typically comprises a competitive video game machine for playing a competitive video game such as a martial-arts combat game.

The game machine 5 has a key input unit 7 for being supplied with control signals from first and second manual controllers 1, 2 which are operated by respective game players, and a control unit 11 which receives commands from the key input unit 7 in response to control signals from the first and second manual controllers 1, 2.

Figure 2:
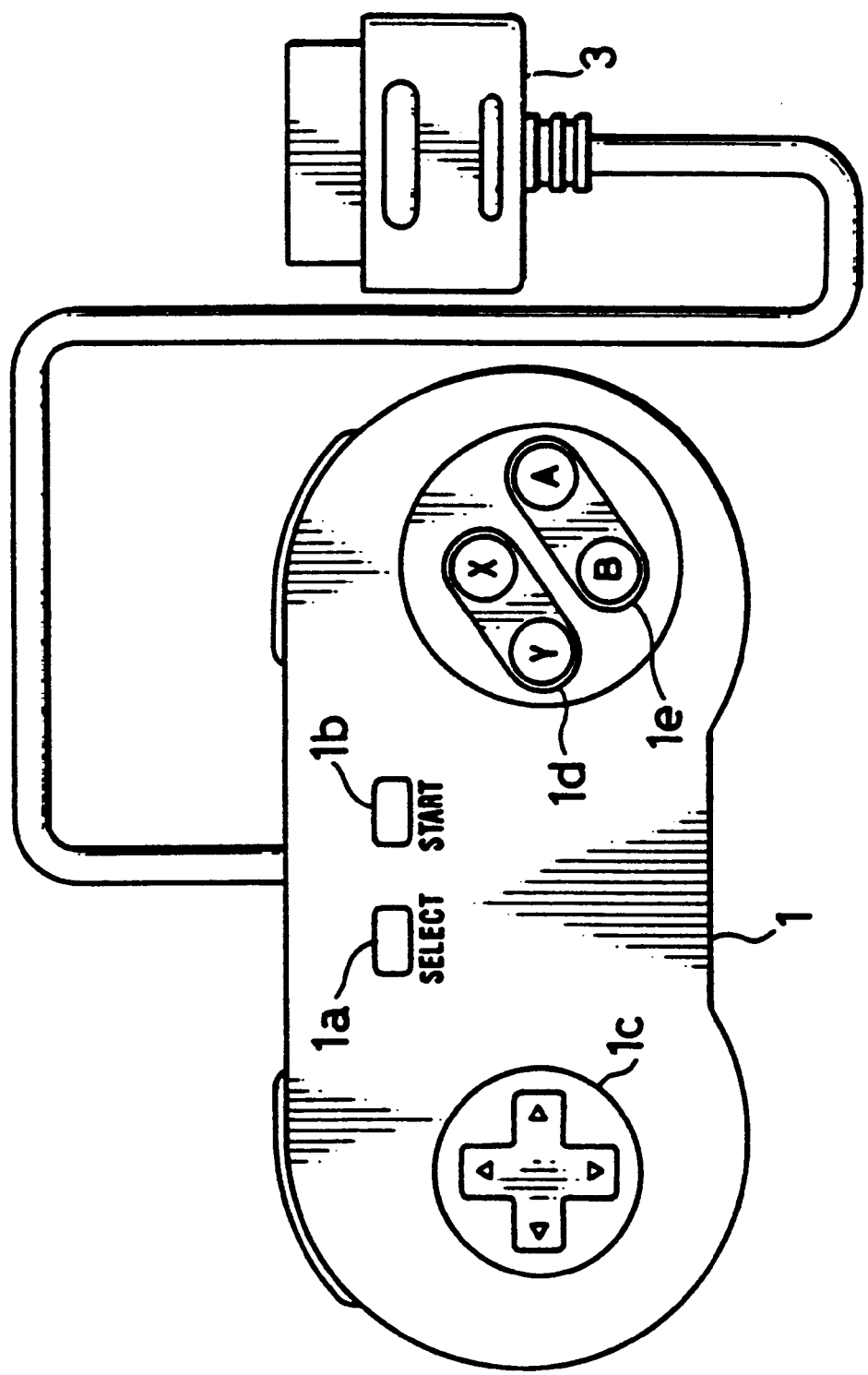
FIG. 2 is a plan view of a manual controller of the apparatus shown in FIG. 1.

As shown in FIG. 2, each of the first and second manual controllers 1, 2 has a select key 1a for making various selections, a start key 1b for starting a match, a cross key 1c for moving a displayed game character, and keys 1d, 1e for causing the displayed image character to make actions.

As shown in FIG. 1, the game machine 5 also has a timer 8 which starts measuring a predetermined period of time for one match of the competitive video game in response to a count control signal which is supplied from the control unit 11 when the start key 1b of either one of the first and second manual controllers 1, 2 is pressed. The game machine 5 includes a memory 9 such as a semiconductor memory or the like which stores image data of two game characters, backgrounds, win and lose presentations, and other data, and a game program for controlling the game machine 5. If the game machine 5 is used as a game machine for home use or a personal computer, then the memory 9 may comprise a recording medium that can be read by a computer, such as a floppy disk, a CD-ROM, a magnetooptical disk, a DVD-CD, or the like.

The game machine 5 has a display unit 10 connected to the control unit 11. The display unit 10 and the control unit 11 jointly make up an image display assembly which reads, from the memory 9, the image data of two game characters that are selected as contestants for a match by the game players using the first and second manual controllers 1, 2, displays images of the two game characters on the display screen of the display unit 10 based on the image data read from the memory 9, and moves the displayed images of the two game characters on the display screen of the display unit 10 in response to control signals from first and second manual controllers 1, 2.

The game machine 5 includes a register unit 13 for registering a table of additive and subtractive elements and points assigned to these additive and subtractive elements. Specifically, the additive and subtractive elements represent a plurality of available combat techniques, effectiveness and ineffectiveness decisions about those combat techniques, and various on-going match details that serve as a basis for determining which one of the game characters is superior to the other, as described later on. The game machine 5 has a first calculator 14 which accumulates points of additive and subtractive elements that can be accumulated while a match is in progress, of all the additive and subtractive elements registered in the register unit 13, for one of the game characters as the match proceeds, and a second calculator 15 which accumulates points of additive and subtractive elements that can be accumulated while a match is in progress, of all the additive and subtractive elements registered in the register unit 13, for the other game character as the match proceeds.

A technique decision unit 17 connected to the control unit 11 and the register unit 13 serves to determine whether the game characters are engaging in a combat situation worth any additive and subtractive elements. Specifically, the technique decision unit 17 determines, from movements of the images of the game characters, combat techniques indicated by the manual controllers 1, 2 and effectiveness and ineffeciveness of those combat techniques. The technique decision unit 17 determines whether a combat technique applied by one of the game characters is effective or ineffective by deciding whether the distance between the game characters is smaller than a predetermined distance for the combat technique that has been indicated, and whether the game player who controls the other game character has indicated a defensive action when the combat technique has been indicated.

A comparator 18 connected to the control unit 11 compares point scores calculated respectively by the first and second calculators 14, 15 when the predetermined period of time measured for one match elapses while the game players are engaging in the match, and judges one of the game characters who has earned more points as the winner. The winning game character is displayed on the display screen of the display unit 10. A win count calculator 19 gives a win count to the game character which has been declared the winner. The win count calculator 19 accumulates win counts for each of the game characters.

The additive elements registered in the register unit 13 include technical points such as combat techniques of higher difficulty, provocations, clean hits, counter hits, hyper counters, serial combat techniques, etc., a life point indicative of remaining virtual physical strengths at the end of a match, and special bonuses including a bonus indicative of use of a wide variety of combat techniques, a hit bonus, and a bonus indicative of successful striking back from a disadvantageous situation. The subtractive elements registered in the register unit 13 mainly include waiting and evasive actions and actions which look unfair to the opponent, collectively referred to as avoidance of conflict. Specifically, these actions which correspond to the subtractive elements apply, for example, when a game character does not attack the opponent for more than a given period of time, when a game character backs away from the opponent beyond a certain distance, when a game character temporarily gets out of the combat arena or ring while being superior to the opponent with respect to the virtual physical strength, when a game character stays at a ring edge for a long period of time with no wall present around the ring, and when a game character backs off after applying a short technique of a particular effect. The additive elements are represented by corresponding positive points, and the subtractive elements are also represented by corresponding negative points.

If point scores representing the sums of the points of the additive and subtractive elements gained by the contesting game players are equal to each other as a result of comparison in the comparator 18, then a special bonus of 1 point is given to one of the game characters which has launched a first attack at the start of a match, and that game character is declared the winner. If both the contesting game players have simultaneously launched a first attack, then a special bonus of 1 point is given to one of the game characters which has been selected first at the start of the game, and that game character is declared the winner. If both the contesting game players have simultaneously been selected at the start of the game, then a special bonus of 1 point is given randomly to one of the game characters, and that game character is declared the winner.

Figure 3:
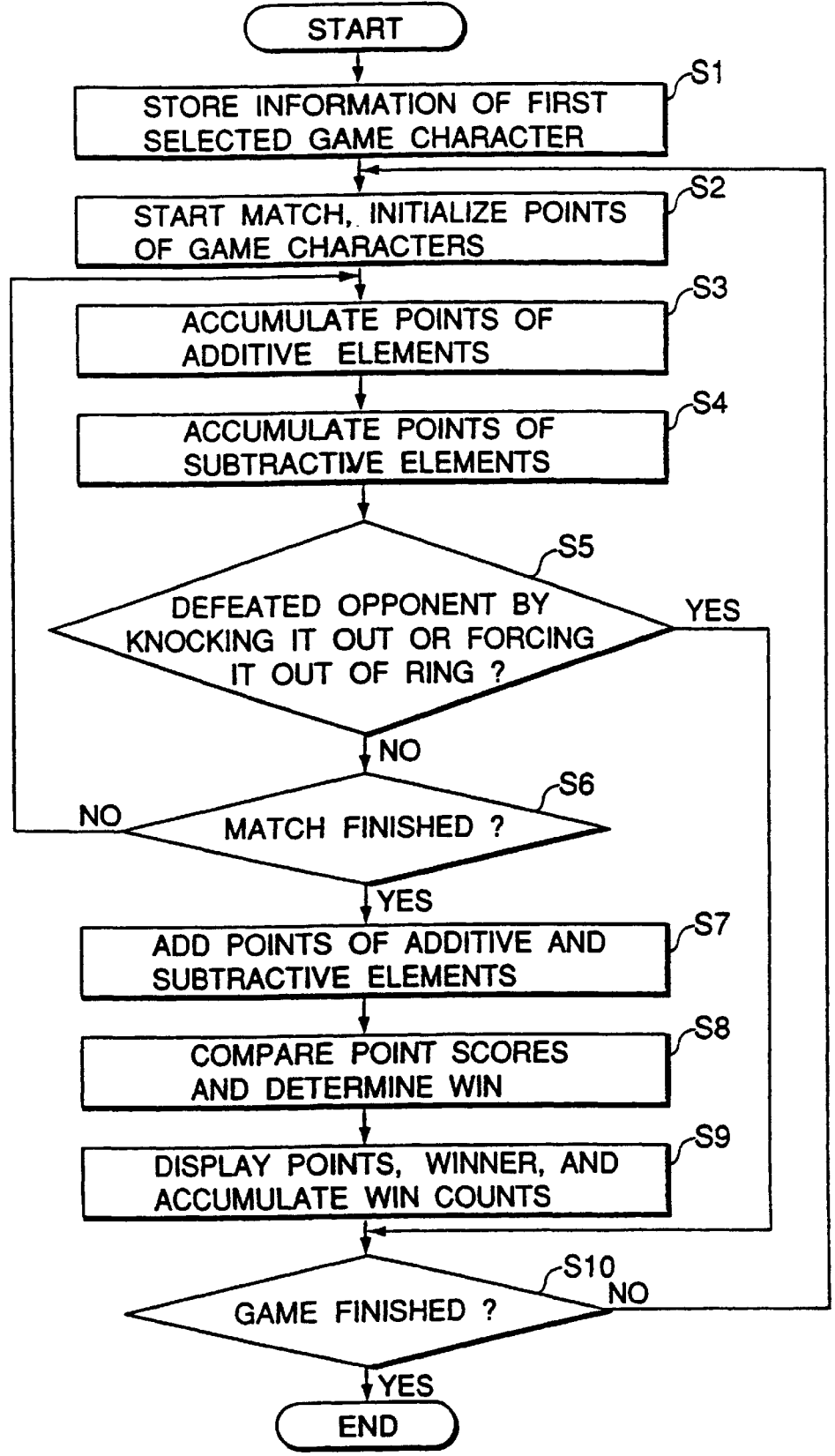
FIG. 3 is a flowchart of an operation sequence of the apparatus shown in FIG. 1.

An operation sequence for determining a win in a competitive video game, typically, a martial-arts combat game, will be described below with reference to FIG. 3.

Before a match of the competitive video game is started, information indicative of a game character which is selected first is stored in a step S1. The stored information will be used to give a special bonus to the game player who selected the game character first if point scores based on the additive and subtractive elements gained by the contesting game players are equal to each other.

Figure 4:
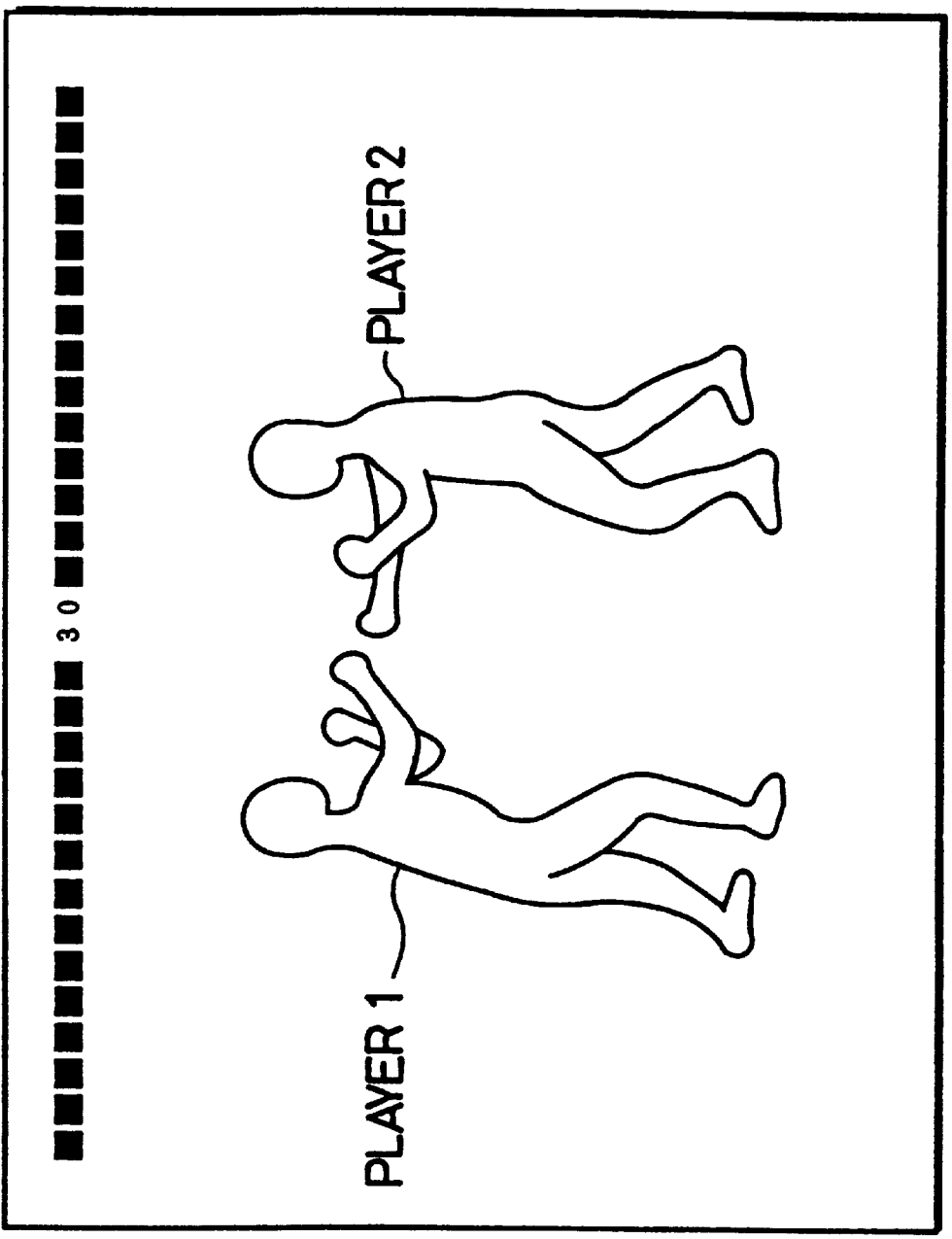
FIG. 4 is a view showing an image of game characters displayed on a display unit of the apparatus shown in FIG. 1.

When the match is started, points of the game characters are initialized in a step S2. Then, the timer 8 starts measuring a predetermined period of time assigned to the match. At this time, as shown in FIG. 4, images of the game characters, indicated by "PLAYER1" and "PLAYER2" are displayed on the display screen of the display unit 10. While the match is in progress, the technique decision unit 17 determines whether movements made by the game characters constitute additive elements or not. If movements made by the game characters constitute additive elements, then the corresponding first and second calculators 14, 15 accumulate points of such additive elements in a step S3. Likewise, the technique decision unit 17 determines whether movements made by the game characters constitute subtractive elements or not. If movements made by the game characters constitute subtractive elements, then the corresponding first and second calculators 14, 15 accumulate points of such subtractive elements in a step S4. The table registered in the register unit 13 contains such data that will increase points if the remaining period of time of the match is shorter than a predetermined period of time in the steps S3, S4. The remaining period of time is displayed on the display screen of the display unit 10, as shown in FIG. 4. In FIG. 4, "30", seconds, for example, is displayed as the remaining period of time.

The control unit 11 then determines whether one of the game characters has defeated the other by knocking it out or forcing it out of the ring in a step S5. If one of the game characters has thus defeated the other ("YES" in the step S5), then control jumps to a step S10 (described later on). If not ("NO" in the step S5), then the control unit 11 determines whether the predetermined period of time measured by the timer 8 has elapsed or not, i.e., the match has come to an end or not, in a step S6. If the match has not yet been finished ("NO" in the step S6), then control goes back to the step S3.

If the match has been finished ("YES" in the step S6), then the first and second calculators 14, 15 accumulate the points of the additive and subtractive elements that the respective game characters have gained at the end of the match in a step S7. The comparator 18 compares the point scores calculated respectively by the first and second calculators 14, 15, and determines which one of the compared point scores is greater than the other, i.e., which one of the game characters has won the match, in a step S8. The image display assembly 12 displays the points earned by the game characters, and also displays the game character with the greater point score as the winner in a step S9. Then, the control unit 11 determines whether the competitive video game is finished or not in a step S10. If the competitive video game is not finished ("NO" in the step S10), then control returns to the step S2. If the competitive video game is finished ("YES" in the step S10), then the operation sequence comes to an end.

Figure 5:
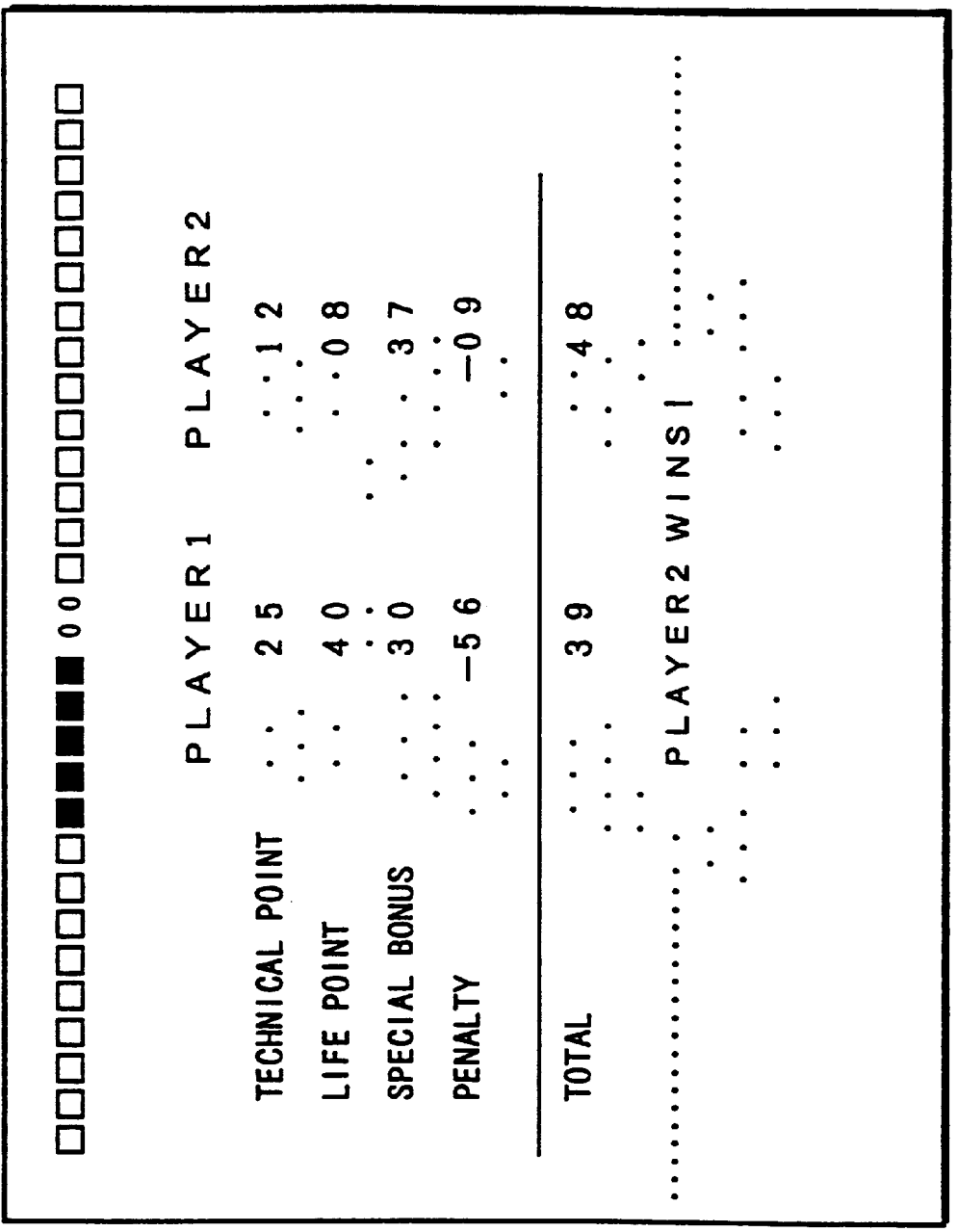
FIG. 5 is a view showing an image of various points displayed on a display unit of the apparatus shown in FIG. 1.

In the step S9 at the end of the match, the various points earned by the game players and the winning game player are displayed on the display screen of the display unit 10, as shown in FIG. 5. As can be seen from FIG. 5, the winner is judged by the sum of points which include not only the remaining virtual physical strength (life point), but also the points of the additive and subtractive elements that have been gained during the match. In FIG. 5, the game character PLAYER2 has won the game because its sum of points, i.e., the point score, "48" is greater than the point score "39" of the other game character PLAYER1.

As described above, when the predetermined period of time assigned to a match runs out, the comparator 18 compares the points of the additive and subtractive elements that have been gained during the match and accumulated by the first and second calculators 14, 15, and judges the game character with the greater point score as the winner. Consequently, unless one of the game characters knocks out the other character or forces the other character out of the ring during the game, the game players cannot easily tell which one of the game characters has won the match. The game players are thus required to keep their attention and do their best to earn as many points as possible all the way until the end of the match. The game players will find the competitive video game exciting and interesting.

In the step S9, a win count is given to the winner of this match, which has been determined in the step S8, and the win count calculator 19 increments the value of the win counts given to the winner so far. If the value of the win counts of one game character, which is greater than the value of the win counts of the other game character, has reached a predetermined value, then the competitive video game is determined as coming to an end in the step S10. If not, then control goes back to the step S2, and the steps S2 through S9 are repeated until the value of the win counts of one game character reaches the predetermined value. The game players may choose between a mode in which they play only one match and a mode in which they play a succession of matches until one of them gains predetermined win counts. When the latter mode is selected, since a winner is determined after a plurality of matches, the game players will find the game interesting. Alternatively, the game players may play a plurality of matches, preferably an odd-number of matches, and one of the game players who has gained more win counts after the matches may be judged as the winner.

The additive and subtractive elements which are described above are given for illustrative purpose only and may be or include other elements. The competitive video game may be any of various two- or more-player combat games other than the martial-arts combat game. The game characters that are displayed may be in the shape of simulated animals or other forms.

Although a certain preferred embodiment of the present invention has been shown and described in detail, it should be understood that various changes and modifications may be made therein without departing from the scope of the appended claims.

What is claimed is:

1. An apparatus for determining a win for a competitive combat video game, comprising:

a display for displaying two game characters;

a pair of manual controllers for controlling the game characters to apply a plurality of techniques and to move with respect to each other;

a timer for measuring a predetermined period of time for a match;

a register for registering additive and subtractive elements representing at least the techniques, effectiveness and ineffectiveness decisions about said techniques, and movements of the game characters, and points assigned to said additive and subtractive elements, said subtractive elements including a avoidance of conflict by one of said game characters;

decision means for determining whether an action indicated by one of said manual controllers to control the game characters corresponds to one of said additive and subtractive elements or not;

calculating means for, if an action indicated by one of said manual controllers to control the game characters is determined as corresponding to one of said additive and subtractive elements, for accumulating the point assigned to said one of said additive and subtractive elements for the corresponding game character; and win decision means for determining one of the game characters which has gained more accumulated points than the other game character as the winner of the match when said predetermined period of time measured by said timer means elapses;

said display means including means for displaying the accumulated points gained by the game characters and the winner of the match.

2. An apparatus according to claim 1, wherein said register means includes means for registering bonus points to be given to one of the game players by said calculating means according to a predetermined rule when accumulated points for the game characters are the same as each other.

3. An apparatus according to claim 1 or 2, further comprising:

win count calculating means for assigning a win count to the winner of the match and accumulating win counts for the game characters;

winner determining means for determining one of the game characters as a final winner when the win counts of said one of the game characters reach a predetermined value; and control means for carrying out a succession of matches for the game characters to play until the win counts of said one of the game characters reach said predetermined value.

4. An apparatus according to claim 1, wherein said avoidance of conflict by said one of said game characters includes at least one of failure to engage another of said game characters for more than a given period of time, backing away from another game character beyond a certain distance, temporarily leaving a combat area while in a superior position, staying at a ring edge of the combat area for a period of time, and backing off after applying a short technique of a particular effect.

5. A method of determining a win for a competitive combat video game, comprising the steps of:

displaying two game characters;

controlling the game characters to apply a plurality of techniques and to move with respect to each other;

measuring a predetermined period of time for a match;

registering additive and subtractive elements representing at least the techniques, effectiveness and ineffectiveness decisions about said techniques, and movements of the game characters, and points assigned to said additive and subtractive elements, said subtractive elements including a avoidance of conflict by one of said game characters;

determining whether an action indicated by one of said manual controllers to control the game characters corresponds to one of said additive and subtractive elements or not;

if an action to control the game characters is determined as corresponding to one of said additive and subtractive elements, accumulating the point assigned to said one of said additive and subtractive elements for the corresponding game character;

determining one of the game characters which has gained more accumulated points than the other game character as the winner of the match when said predetermined period of time elapses; and displaying the accumulated points gained by the game characters and the winner of the match.

6. A method according to claim 5, further comprising the step of registering a bonus point to be given to one of the game players according to a predetermined rule when accumulated points for the game characters are the same as each other.

7. A method according to claim 5 or 6, further comprising the steps of:

assigning a win count to the winner of the match and accumulating win counts for the game characters;

determining one of the game characters as a final winner when the win counts of said one of the game characters reach a predetermined value; and carrying out a succession of matches for the game characters to play until the win counts of said one of the game characters reach said predetermined value.

8. A method according to claim 5, wherein said avoidance of conflict by said one of said game characters includes at least one of failure to engage another of said game characters for more than a given period of time, backing away from another game character beyond a certain distance, temporarily leaving a combat area while in a superior position, staying at a ring edge of the combat area for a period of time, and backing off after applying a short technique of a particular effect.

9. A computer-readable medium having stored thereon a win determining program for a competitive combat video game comprising executable code for execution by a computer processor causing said computer processor to perform the steps of:

displaying two game characters;

controlling the game characters to apply a plurality of techniques and to move with respect to each other;

measuring a predetermined period of time for a match;

registering additive and subtractive elements representing at least the techniques, effectiveness and ineffectiveness decisions about said techniques, and movements of the game characters, and points assigned to said additive and subtractive elements, said subtractive elements including a avoidance of conflict by one of said game characters;

determining whether an action indicated by one of said manual controllers to control the game characters corresponds to one of said additive and subtractive elements or not;

if an action to control the game characters is determined as corresponding to one of said additive and subtractive elements, accumulating the point assigned to said one of said additive and subtractive elements for the corresponding game character;

determining one of the game characters which has gained more accumulated points than the other game character as the winner of the match when said predetermined period of time elapses; and displaying the accumulated points gained by the game characters and the winner of the match.

10. A computer-readable medium according to claim 9, wherein said win determining program further comprises the step of registering a bonus point to be given to one of the game players according to a predetermined rule when accumulated points for the game characters are the same as each other.

11. A computer-readable medium according to claim 9 or 10, wherein said win determining program further comprises the steps of:

assigning a win count to the winner of the match and accumulating win counts for the game characters;

determining one of the game characters as a final winner when the win counts of said one of the game characters reach a predetermined value; and carrying out a succession of matches for the game characters to play until the win counts of said one of the game characters reach said predetermined value.

12. A computer-readable medium according to claim 9, wherein said avoidance of conflict by said one of said game characters includes at least one of failure to engage another of said game characters for more than a given period of time, backing away from another game character beyond a certain distance, temporarily leaving a combat area while in a superior position, staying at a ring edge of the combat area for a period of time, and backing off after applying a short technique of a particular effect.

* * * * *